(12) United States Patent  (10) Patent No.: US 8,549,880 B2
Kumai  (45) Date of Patent: *Oct. 8, 2013

(54) METHOD FOR PRODUCING POLARIZING ELEMENT

(75) Inventor: Yoshitomo Kumai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 13/420,749

(22) Filed: Mar. 15, 2012

(65) Prior Publication Data

US 2012/0237674 A1 Sep. 20, 2012

(30) Foreign Application Priority Data

Mar. 18, 2011 (JP) ................... 2011-061051

(51) Int. Cl.
*C03C 17/09* (2006.01)
*C03B 23/037* (2006.01)
*C03B 32/00* (2006.01)

(52) U.S. Cl.
USPC .......... 65/60.1; 65/60.4; 65/60.7; 65/64; 65/32.1; 65/32.4; 359/492.01; 359/282; 359/485.03; 427/163.1; 427/171; 427/165; 204/192.1; 204/192.26

(58) Field of Classification Search
USPC ............ 65/33.1, 33.3, 33.4, 60.1, 60.4
See application file for complete search history.

(56) References Cited

U.S. PATENT DOCUMENTS

| 3,325,299 | A | * | 6/1967 | Araujo | 501/13 |
| 3,540,793 | A | * | 11/1970 | Stookey et al. | 359/241 |
| 3,653,863 | A | * | 4/1972 | Araujo et al. | 65/30.11 |
| 3,954,485 | A | * | 5/1976 | Seward et al. | 501/13 |
| 4,304,584 | A | * | 12/1981 | Borrelli et al. | 65/30.11 |
| 4,339,256 | A | * | 7/1982 | Simms | 65/32.5 |
| 4,479,819 | A | * | 10/1984 | Borelli et al. | 65/30.11 |
| 4,486,213 | A | * | 12/1984 | Lentz et al. | 65/30.11 |
| 5,122,907 | A | * | 6/1992 | Slocum | 359/797 |
| 5,430,573 | A | * | 7/1995 | Araujo et al. | 359/361 |
| 5,517,356 | A | * | 5/1996 | Araujo et al. | 359/487.06 |
| 5,864,427 | A | * | 1/1999 | Fukano et al. | 359/487.06 |
| 5,886,820 | A | * | 3/1999 | Tajima et al. | 359/487.06 |
| 5,999,315 | A | * | 12/1999 | Fukano et al. | 359/484.03 |
| 6,089,042 | A | * | 7/2000 | Gill et al. | 65/30.1 |
| 6,122,103 | A | * | 9/2000 | Perkins et al. | 359/485.03 |
| 6,171,762 | B1 | * | 1/2001 | Borrelli et al. | 430/314 |
| 6,298,691 | B1 | * | 10/2001 | Borrelli et al. | 65/30.1 |
| 6,524,773 | B1 | * | 2/2003 | Borrelli et al. | 430/322 |
| 6,536,236 | B2 | * | 3/2003 | Grossman et al. | 65/30.11 |
| 6,563,639 | B1 | * | 5/2003 | Borrelli et al. | 359/484.03 |
| 6,606,885 | B2 | * | 8/2003 | Harris et al. | 65/30.11 |
| 6,772,608 | B1 | * | 8/2004 | Drost et al. | 65/30.1 |

(Continued)

FOREIGN PATENT DOCUMENTS

| JP | 56-169140 | 12/1981 |
| JP | 07-120615 | 5/1995 |
| JP | 4394355 | 10/2009 |

*Primary Examiner* — Jason L Lazorcik
(74) *Attorney, Agent, or Firm* — Workman Nydegger

(57) ABSTRACT

A method for producing a polarizing element includes the steps of: forming a coating film of a metal on a glass substrate; forming an island-shaped film composed of a metal halide on the glass substrate by partially removing the coating film and also halogenating the metal; forming needle-shaped particles of the metal halide by stretching the glass substrate through heating to elongate the island-shaped film; and forming needle-shaped metal particles composed of a metal by reducing the metal halide of the needle-shaped particles.

4 Claims, 4 Drawing Sheets

FILM FORMATION (S1)

ISLAND-SHAPED FILM FORMATION (HALOGENATION) (S2)

(56) References Cited

U.S. PATENT DOCUMENTS

| | | | |
|---|---|---|---|
| 6,775,062 B2* | 8/2004 | Borrelli et al. | 359/484.03 |
| 6,777,359 B2* | 8/2004 | Yamashita et al. | 501/67 |
| 6,912,087 B1* | 6/2005 | Borrelli et al. | 359/485.03 |
| 7,104,090 B2* | 9/2006 | Borrelli et al. | 65/32.1 |
| 7,230,760 B2* | 6/2007 | Naylor et al. | 359/484.03 |
| 7,468,148 B2* | 12/2008 | Borrelli et al. | 252/500 |
| 7,510,989 B2* | 3/2009 | Borrelli et al. | 501/32 |
| 7,618,908 B2* | 11/2009 | Borrelli et al. | 501/19 |
| 7,648,656 B2* | 1/2010 | Borrelli et al. | 252/514 |
| 7,817,340 B2* | 10/2010 | Borrelli et al. | 359/487.06 |
| 8,077,389 B2* | 12/2011 | Jabri et al. | 359/487.02 |
| 8,114,797 B2* | 2/2012 | Yoneda et al. | 501/56 |
| 8,174,764 B2* | 5/2012 | Yoneda | 359/484.03 |
| 8,179,595 B2* | 5/2012 | Borrelli et al. | 359/361 |
| 2002/0053221 A1* | 5/2002 | Grossman et al. | 65/32.1 |
| 2003/0136152 A1* | 7/2003 | Borrelli et al. | 65/32.1 |
| 2003/0202245 A1* | 10/2003 | Borrelli et al. | 359/492 |
| 2006/0247117 A1* | 11/2006 | Borrelli et al. | 501/10 |
| 2007/0093373 A1* | 4/2007 | Borrelli et al. | 501/2 |
| 2007/0093374 A1* | 4/2007 | Borrelli et al. | 501/2 |
| 2007/0125126 A1* | 6/2007 | Ichimura et al. | 65/33.1 |
| 2007/0141350 A1* | 6/2007 | Borrelli et al. | 428/410 |
| 2007/0153383 A1* | 7/2007 | Borrelli et al. | 359/492 |
| 2009/0190214 A1* | 7/2009 | Borrelli et al. | 359/486 |
| 2009/0190215 A1* | 7/2009 | Borrelli et al. | 359/488 |
| 2010/0167904 A1* | 7/2010 | Ichimura et al. | 501/32 |
| 2011/0255161 A1* | 10/2011 | Yoneda | 359/484.03 |
| 2012/0192592 A1* | 8/2012 | Borrelli et al. | 65/32.5 |

\* cited by examiner

FILM FORMATION (S1)

ISLAND-SHAPED FILM FORMATION (HALOGENATION) (S2)

STRETCHING (S3)

REDUCTION (S4)

METHOD FOR PRODUCING POLARIZING ELEMENT

BACKGROUND

1. Technical Field

The present invention relates to a method for producing a polarizing element.

2. Related Art

As one type of polarizing element, a polarizing glass is known. A polarizing glass can be composed of only an inorganic substance, and therefore, as compared with a polarizing plate containing an organic substance, the deterioration thereof due to light is significantly less. Therefore, a polarizing glass has drawn attention as an effective optical device in a liquid crystal projector whose brightness has been enhanced recently.

As a general polarizing glass, those described in JP-A-56-169140 are known, and a method for producing such a polarizing glass is as follows.

(1) A glass product having a desired shape is produced from a composition containing silver and at least one halide selected from the group consisting of chlorides, bromides, and iodides.

(2) The produced glass product is heated to a temperature which is higher than the strain point but not higher than the softening point of the glass by about 50° C. for a period of time sufficient to produce crystals of AgCl, AgBr, or AgI in the glass product, whereby a crystal-containing product is produced.

(3) The resulting crystal-containing product is elongated under stress at a temperature which is higher than the annealing point but lower than a temperature at which the glass has a viscosity of about 108 poises so that the crystals are elongated to have an aspect ratio of at least 5:1.

(4) The elongated product is exposed to a reducing atmosphere at a temperature which is higher than about 250° C. but not higher than the annealing point of the glass by about 25° C. for a period of time sufficient to develop a chemically reduced surface layer on the product. By this process, at least a portion of the elongated silver halide particles are reduced to elemental silver.

Meanwhile, there is also known a method in which after silver or copper is introduced into a glass surface layer by an ion exchange method, a silver or copper halide phase is deposited, and the deposited halide phase is elongated, thereby forming a layer having a polarization separation function on the surface layer of a glass product (see Japanese Patent No. 4394355).

According to the production method described in JP-A-56-169140, the halide deposits uniformly in the glass product, however, in the reducing step, the halide only in the surface layer of the glass product can be reduced, and therefore, the halide remains in a central portion in the thickness direction of the glass product. Due to this, the transmittance of a polarizing element is decreased and when the glass product is applied to a liquid crystal display apparatus or the like, there is a possibility that a sufficient brightness cannot be obtained.

On the other hand, according to the method described in Japanese Patent No. 4394355, silver or copper is introduced only into a surface layer portion of the glass product, and therefore, the above problem caused by the halide remaining without being reduced can be prevented. However, it is necessary to immerse the glass product in a molten salt at a high temperature (350 to 750° C.) for as long as about 8 hours, and therefore, an environmental load is large. In other words, the consumption energy for the production is extremely large and the productivity is low.

SUMMARY

An advantage of some aspects of the invention is to provide a method for simply producing a polarizing element having excellent optical properties.

A method for producing a polarizing element according to an aspect of the invention includes the steps of: forming a coating film of a metal on a glass substrate; forming an island-shaped film composed of a metal halide on the glass substrate by partially removing the coating film and also halogenating the metal; forming needle-shaped particles of the metal halide by stretching the glass substrate through heating to elongate the island-shaped film; and forming needle-shaped metal particles composed of the metal by reducing the metal halide of the needle-shaped particles.

According to this production method, an island-shaped film of a metal halide is formed on a surface of a glass substrate, and the island-shaped film is stretched to form needle-shaped particles, followed by reduction, thereby forming needle-shaped metal particles. Therefore, the metal halide can be reliably reduced. Thus, deterioration of the optical properties due to the residual metal halide is not caused. Further, since the island-shaped film of the metal halide is formed on the glass substrate using a thin-film forming step, the production can be performed by a significantly simple step as compared with the related art step in which a metal is introduced into a surface layer of a glass by ion exchange. Thus, the consumption energy for the production can be extremely reduced, and also the productivity can be increased.

The production method may be configured such that the step of forming the island-shaped film composed of the metal halide includes the steps of: forming the island-shaped film by etching the coating film; and halogenating the metal by exposing the glass substrate to a gas containing a halogen or a halogen compound.

According to this configuration, the etching of the coating film into the form of islands and the halogenation of the metal constituting the island-shaped film are performed in separate steps, and therefore, the respective steps can be optimized. For example, the arrangement density of the island-shaped particles or the shape thereof can be easily controlled. Further, in the halogenating process, it becomes possible to select a process gas by giving priority to the physical properties of the metal halide to be produced or the halogenation efficiency. Accordingly, the controllability of the optical properties of the polarizing element is easily enhanced or the production efficiency is easily increased.

The production method may be configured such that the step of forming the island-shaped film composed of the metal halide is a step of exposing the coating film to plasma of a gas containing a halogen or a halogen compound, thereby halogenating the metal while partially removing the coating film.

According to this configuration, the processing and halogenation of the coating film can be performed in one step, and therefore, the island-shaped film composed of the metal halide can be formed efficiently in a short time.

The production method may be configured such that the metal is one or more metals selected from Au, Ag, Cu, Cd, and Al.

According to this configuration, the needle-shaped metal particles suitable for a polarizing element can be easily obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
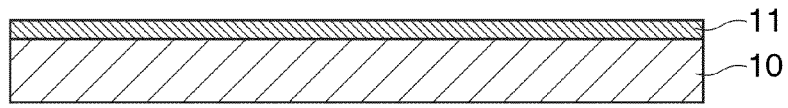
FIGS. 1A to 1D are views for illustrating a method for producing a polarizing element according to an embodiment.
Figure 1B:
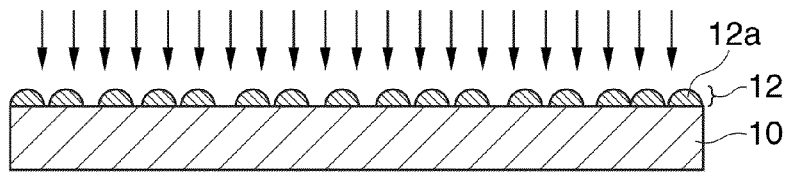

Hereinafter, embodiments of the invention will be described with reference to the accompanying drawings.

Incidentally, the scope of the invention is not limited to the following embodiments and can be arbitrarily changed within the scope of the technical idea of the invention. Further, in the following drawings, in order to make each structure easily understandable, the scale, the number, or the like in each structure is made different from that in the actual structure in some cases.

FIGS. 1A to 1D are views for illustrating a method for producing a polarizing element according to this embodiment.

As shown in FIGS. 1A to 1D, the method for producing a polarizing element according to this embodiment includes a film forming step S1, an island-shaped film forming step S2, a stretching step S3, and a reducing step S4.

The film forming step S1 is a step of forming a coating film 11 of a metal on a glass substrate 10.

The glass substrate 10 is not particularly limited, and any known glass substrate can be used. This is because in the method for producing a polarizing element according to this embodiment, it is not necessary to deposit a metal halide in the glass substrate or introduce a metal ion into the surface of the glass substrate by ion exchange, and the glass substrate may be any as long as the coating film 11 of a metal halide can be formed thereon. Specifically, any of various glass substrates such as quartz glass, soda lime glass, sapphire glass, borosilicate glass, and aluminoborosilicate glass can be used according to the intended use of the polarizing element.

A method for forming the coating film 11 is not particularly limited as long as a metal thin film having a desired thickness can be formed by the method, and either of a gas phase method and a liquid phase method may be used. In the case of using a gas phase method, either of a physical vapor deposition method and a chemical vapor deposition method may be used. Since the film forming species is a metal and the thickness of the formed film is from about several nanometers to several tens nanometers, it is convenient to use a sputtering-based physical vapor deposition method. Examples of the sputtering-based physical vapor deposition method include magnetron sputtering, ion beam sputtering, and ECR sputtering.

Incidentally, in place of the above-described sputtering-based physical vapor deposition method, an evaporation-based physical vapor deposition method such as a vacuum vapor deposition method, a molecular beam vapor deposition method (MBE), an ion plating method, or an ion beam vapor deposition method may also be used.

In the film forming step S1, for example, in the case of using a sputtering method, the coating film 11 can be formed using a target composed of one or more metals selected from Au, Ag, Cu, Cd, and Al as a metal target and also using a typical process gas such as Ar.

Subsequently, in the island-shaped film forming step S2, a process in which the coating film 11 is exposed to plasma of a gas containing a halogen or a halogen compound is performed. By this process, the process of forming an island-shaped film 12 composed of a large number of island-shaped particles 12a by etching the coating film 11 formed in the film forming step S1 and the process of halogenating the metal constituting the coating film 11 (island-shaped film 12) are performed simultaneously. According to the island-shaped film forming step S2, an island-shaped film 12 which is an assembly of island-shaped particles 12a composed of a metal halide is formed on the glass substrate 10.

As the process gas to be used in the plasma treatment, a halogen gas ($F_2$, $Cl_2$, $Br_2$, or $I_2$) or a halogen compound gas can be used alone or along with an inert gas such as Ar. The halogen compound is not particularly limited, however, examples thereof include boron compounds such as $BCl_3$, $BBr_3$, and $BF_3$; fluorocarbon compounds such as $CF_4$ and $C_2F_6$; germanium compounds such as $GeCl_4$ and $GeF_4$; silicon compounds such as $SiCl_4$ and $SiF_4$; silane compounds such as $SiHCl_3$ and $SiH_2Cl_2$; $NF_3$, $PF_3$, $SF_6$, $SnCl_4$, $TiCl_4$, and $WF_6$.

By the plasma treatment, a halogen radical in the plasma is allowed to react with the metal constituting the coating film 11 so that the coating film 11 is converted to one composed of a metal halide. The formed metal halide is, for example, AgClx, AlF, AgF, AgBr, AgI, AgClx, or the like.

Further, during the plasma treatment, along with the halogenation reaction, ion sputtering occurs, and therefore, the coating film 11 is gradually etched. The coating film 11 is partially removed by utilizing this action, whereby the island-shaped film 12 in which a large number of island-shaped particles 12a are arranged in a plane is formed.

Figure 2A:
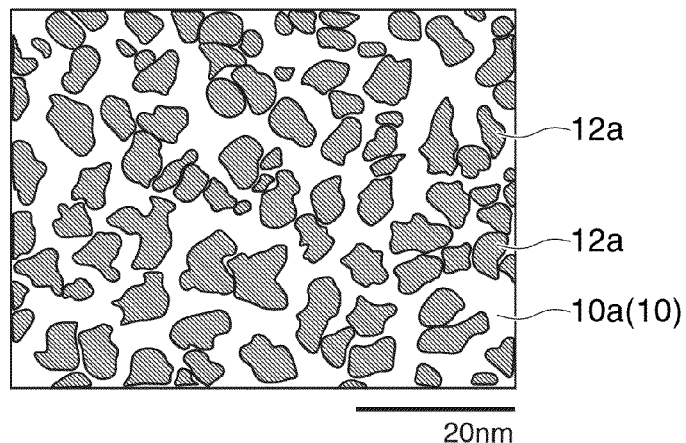
FIG. 2A is a plan view for illustrating a surface of a glass substrate after an island-shaped film forming step.

FIG. 2A is a plan view for illustrating a surface of the glass substrate after the island-shaped film forming step S2. As shown in FIG. 2A, by the above-described plasma treatment, island-shaped particles 12a composed of a metal halide (such as AgClx or AlF) having a particle diameter of about 2 to 8 nm are formed in plan view. In a region among the island-shaped particles 12a, a region 10a in which the surface of the glass substrate 10 is exposed is formed.

Incidentally, in the island-shaped film forming step S2 according to this embodiment, it is necessary to allow the coating film 11 to remain in the form of islands while halogenating the coating film 11, and therefore, it is not preferred that the formed metal halide is excessively etched. Therefore, it is preferred that by setting a substrate bias lower than that in the case of performing common reactive dry etching or by applying no substrate bias, the acceleration of ions incident to the glass substrate 10 is slowed and also the ratio of ions incident perpendicularly to the glass substrate 10 is suppressed to low. The etching rate in the island-shaped film forming step S2 is preferably set in a range of 5 nm/min to 100 nm/min although it depends on the thickness of the coating film 11.

Incidentally, in the island-shaped film forming step S2 according to this embodiment, the halogenation of the metal constituting the coating film 11 and the formation of the island-shaped particles 12a are performed simultaneously, however, these may be performed in separate steps. That is, as the island-shaped film forming step, a step including an etching step in which the coating film 11 is partially removed and formed into the shape of islands and a halogenating step in which the metal constituting the coating film 11 is halogenated may be performed. The order of the etching step and the halogenating step may be reversed.

In the etching step, it is preferred to use a dry etching process, and a sputter etching process using an inert gas (such as Ar) is simple and preferred.

Further, in some cases, for the purpose of only processing the coating film 11, a reactive dry etching process using a reactive gas (such as $Cl_2$, $BCl_3$, HBr, $CF_4$, or $SF_6$) may be performed. In the reactive dry etching process in this case, it is not necessary to halogenate the metal constituting the coating film 11, and therefore, processing can be performed under a condition in which all of the island-shaped particles 12a are not halogenated, or the type of the reactive gas can be selected by giving priority to the processing properties.

In the halogenating step, a method in which the metal is halogenated by exposing the glass substrate 10 to a gas containing a halogen or a halogen compound to bring the coating film 11 into contact with the gas can be used. For example, a method in which halogenation is allowed to proceed from the surface of the coating film 11 by heating the glass substrate 10 in an atmosphere containing $Cl_2$ gas or $Br_2$ gas can be used.

Incidentally, a plasma treatment using a process gas containing a halogen may be performed for the purpose of only effecting halogenation. In this case, it is not necessary to consider the processability of the coating film 11, and therefore, the process gas can be selected by giving priority to the physical properties of a metal halide to be produced or the halogenation efficiency.

Figure 1C:
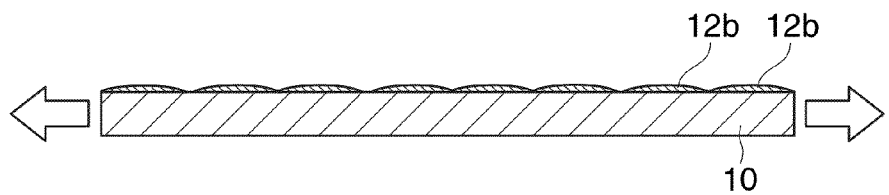
Figure 1D:
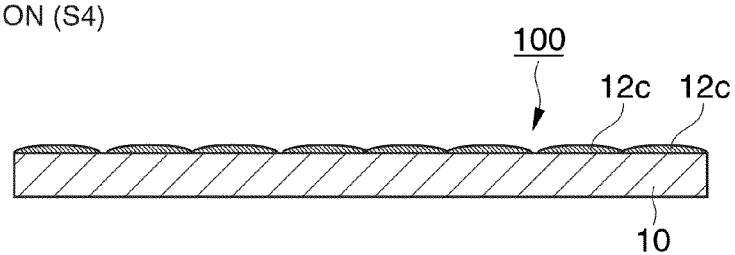

Subsequently, in the stretching step S3, as shown in FIG. 1C, the glass substrate 10 softened by heating is stretched in a direction parallel to the plane of the glass substrate 10 on which the island-shaped particles 12a are formed. As a method for stretching the glass substrate 10, a stretching process in which the glass substrate 10 is stretched in a direction parallel to the plane of the glass substrate 10 may be used or a rolling process in which the glass substrate 10 is rolled thin by pressure may be used. The heating temperature in the stretching step S3 is not particularly limited, and the glass substrate 10 may be heated to a temperature at which the glass substrate 10 can be softened without melting.

Figure 2B:
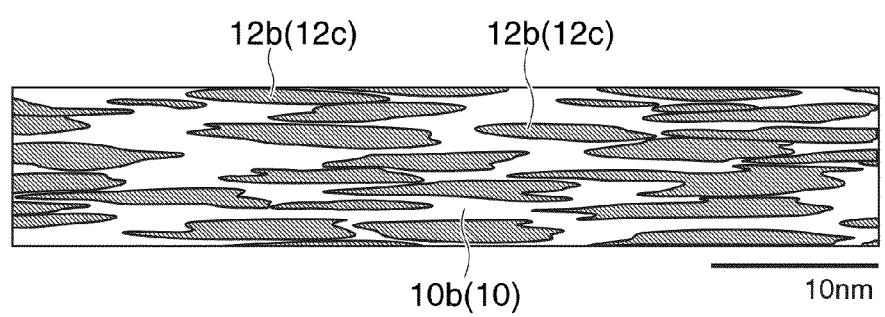
FIG. 2B is a plan view for illustrating the surface of the glass substrate after a stretching step.

By the stretching step S3, the glass substrate 10 is stretched in a stretching direction and processed thin. In addition, the island-shaped particles 12a on the glass substrate 10 are also stretched in the stretching direction, and, as shown in FIG. 2B, formed into a large number of needle-shaped particles 12b oriented in a stretching direction (in a horizontal direction in FIG. 2B) on the glass substrate 10. The needle-shaped particles 12b have an elongated shape with an aspect ratio of 5 or more, and for example, have a width of about 1 to 3 nm and a length of about 5 to 20 nm.

Further, in a region among the plurality of needle-shaped particles 12b, an elongated slit-shaped region 10b is formed by stretching the region 10a shown in FIG. 2A. As for the size of the slit-shaped region 10b, although it varies depending on the density of the formed island-shaped particles 12a, the width thereof is from about 1 to 10 nm and the length thereof is from about 3 to 50 nm.

Subsequently, in the reducing step S4, the glass substrate 10 is placed in a reducing atmosphere such as hydrogen and is also heated, whereby the metal halide constituting the needle-shaped particles 12b is reduced. By this step, needle-shaped metal particles 12c are formed on the glass substrate 10. For example, in the case where the needle-shaped particles 12b are composed of AgClx, needle-shaped metal particles 12c composed of Ag are formed. In the case where the needle-shaped particles 12b are composed of AlF, needle-shaped metal particles 12c composed of Al are formed.

According to the above-described steps, a polarizing element 100 in which a large number of needle-shaped metal particles 12c which are oriented in the same direction in a plane of the glass substrate 10 are arranged with the slit-shaped region 10b interposed thereamong can be formed on the glass substrate 10.

The polarizing element 100 produced by the production method according to this embodiment can be used as an optical element which has a function of separating transmitted light into linearly polarized light in a predetermined vibrating direction since the needle-shaped metal particles 12c having a width less than that of the wavelength of visible light are arranged at a narrow pitch.

Further, in the polarizing glass of the related art, the arrangement density of the needle-shaped metal particles was about 20 particles or less per cubic micrometer, and therefore, in order to obtain high polarization separation performance, it was necessary to distribute the needle-shaped metal particles widely in a thickness direction of the glass substrate. On the other hand, in the polarizing element according to this embodiment, the needle-shaped metal particles 12c are arranged at a high density on the surface of the glass substrate 10, and therefore, the glass substrate 10 having an arbitrary thickness can be used, and it is also easy to produce a thin polarizing element.

According to the production method of this embodiment described in detail above, the island-shaped particles 12a composed of a metal halide are formed on the surface of the glass substrate 10 using a thin-film forming technique, followed by stretching and reduction, and therefore, the metal halide can be reliably reduced and the needle-shaped metal particles 12c composed of only a metal can be easily and reliably obtained. Accordingly, unlike the polarizing glass of the related art, the light transmittance of the polarizing element is not decreased by a residual metal halide in the glass substrate.

Further, since a thin-film forming technique such as a sputtering or plasma treatment is used for forming the island-shaped particles 12a, there is no need for a production step in which a glass substrate is immersed in a molten salt at a high temperature for a long period of time, for example, a process of introducing a metal element into a surface layer portion of a glass substrate by ion exchange. Accordingly, the consumption energy for the production can be extremely reduced and an environmental load can be reduced. Further, the production method according to this embodiment is excellent in productivity as compared with the production method of the related art.

Further, according to the production method of this embodiment, the island-shaped film 12 is formed by partially removing the coating film 11 in the island-shaped film forming step S2, and therefore, the arrangement density of the island-shaped particles 12a can be extremely easily controlled. That is, the optical properties of the polarizing element can be extremely easily controlled.

Further, according to the production method of this embodiment, the island-shaped particles 12a composed of a metal halide are formed by forming the coating film 11 of a metal, and then processing the coating film 11 into the form of islands and also halogenating the metal, and therefore, it is easy to change the material of the metal halide to another material, and even a material which could not be used in the process for producing a polarizing glass of the related art can be used. Since the range of selection of the materials is widened in this manner, it becomes easy to control the optical properties of the polarizing element and also it becomes easy to increase the productivity.

EXAMPLES

Hereinafter, the invention will be described in more detail with reference to Examples, however, the technical scope of the invention is not limited to the following Examples.

Example 1

A glass substrate was disposed in a vacuum vessel of a parallel plate type sputtering apparatus to which an Ag target (purity: 99.99%, thickness: 5 mm, shape: disk) was attached as a metal target (a distance between the substrate and the target: 110 mm). Subsequently, while introducing Ar gas (purity: 99.999%, flow rate: 100 sccm) into the vacuum vessel to give a pressure of 0.4 Pa, an AC power (oscillation frequency: 13.56 MHz) was applied to the Ag target at 100 W, and film formation was performed for 1 minute. By doing this, sputtered Ag particles were deposited on the glass substrate, whereby an Ag film having a thickness of 10 nm was formed.

Subsequently, the glass substrate having the Ag film formed thereon was placed in a vacuum vessel of an ICP dry etcher. Then, $Cl_2$ plasma was generated by applying an AC power (oscillation frequency: 13.56 MHz) to an ICP antenna at 500 W while introducing $Cl_2$ gas (flow rate: 50 sccm) into the vacuum vessel to give a pressure of 5.0 Pa, and the Ag film was subjected to a plasma treatment under a condition that a substrate bias was 0 W.

Figure 3:
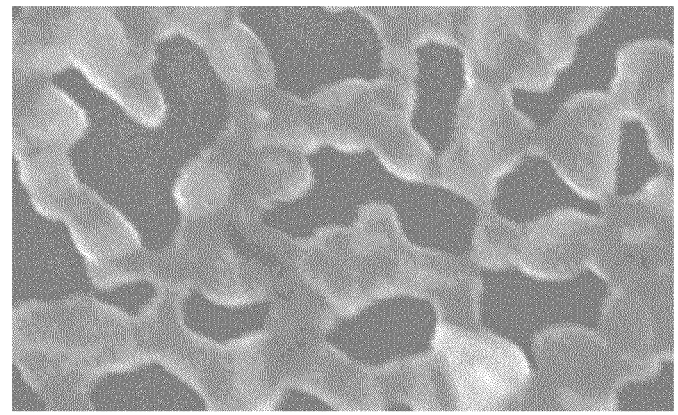
FIG. 3 is an SEM photograph of an island-shaped film according to Example 1.

By the above plasma treatment, an island-shaped film could be formed on the glass substrate. FIG. 3 shows an SEM (scanning electron microscope) photograph of the island-shaped film. The island-shaped film shown in FIG. 3 had island-shaped particles which are composed of $AgCl_x$, have a particle diameter of about 50 to 200 nm, and are arranged in a plane and also had a region in which the surface of the substrate is exposed among the island-shaped particles.

Subsequently, by stretching the glass substrate, the island-shaped film composed of $AgCl_x$ was stretched along with the glass substrate, whereby needle-shaped particles 12b composed of $AgCl_x$ and having a shape as shown in FIG. 2B could be obtained. Further, by reducing the metal halide constituting the needle-shaped particles 12b, needle-shaped metal particles 12c composed of Ag were formed.

Example 2

Under the same condition as in Example 1, an Ag film having a thickness of 10 nm was formed on a glass substrate.

Subsequently, the glass substrate having the Ag film formed thereon was placed in a vacuum vessel of an ICP dry etcher. Then, fluorocarbon plasma was generated by applying an AC power (oscillation frequency: 13.56 MHz) to an ICP antenna at 500 W while introducing $CF_4$ gas (flow rate: 20 sccm) and $C_2F_6$ gas (flow rate: 30 sccm) into the vacuum vessel to give a pressure of 5.0 Pa, and the Ag film was subjected to a plasma treatment under a condition that a substrate bias was 0 W.

Figure 4:
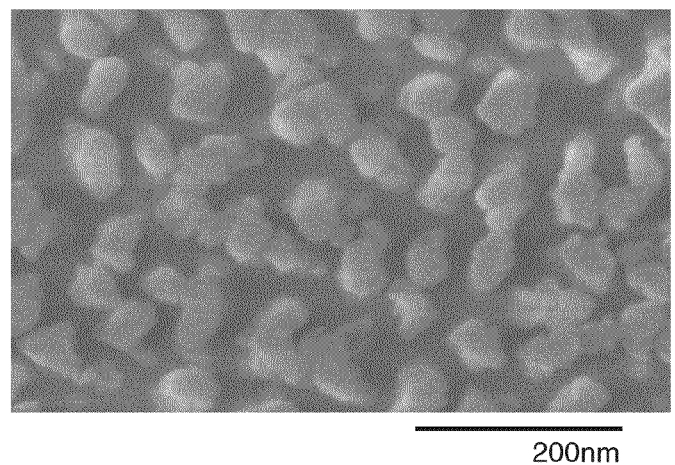
FIG. 4 is an SEM photograph of an island-shaped film according to Example 2.

By the above plasma treatment, an island-shaped film could be formed on the glass substrate. FIG. 4 shows an SEM photograph of the island-shaped film. The island-shaped film shown in FIG. 4 had island-shaped particles which are composed of AgF, have a particle diameter of about 50 nm, and are arranged in a plane and also had a region in which the surface of the substrate is exposed among the island-shaped particles.

Subsequently, by stretching the glass substrate, the island-shaped film composed of AgF was stretched along with the glass substrate, whereby needle-shaped particles 12b composed of AgF and having a shape as shown in FIG. 2B could be obtained. Further, by reducing the metal halide constituting the needle-shaped particles 12b, needle-shaped metal particles 12c composed of Ag were formed.

Example 3

A glass substrate was disposed in a vacuum vessel of a parallel plate type sputtering apparatus to which an Al target (purity: 99.99%, thickness: 5 mm, shape: disk) was attached as a metal target (a distance between the substrate and the target: 110 mm). Subsequently, while introducing Ar gas (purity: 99.999%, flow rate: 100 sccm) into the vacuum vessel to give a pressure of 0.4 Pa, an AC power (oscillation frequency: 13.56 MHz) was applied to the Al target at 100 W, and film formation was performed for 1 minute. By doing this, sputtered Al particles were deposited on the glass substrate, whereby an Al film having a thickness of 10 nm was formed.

Figure 5:
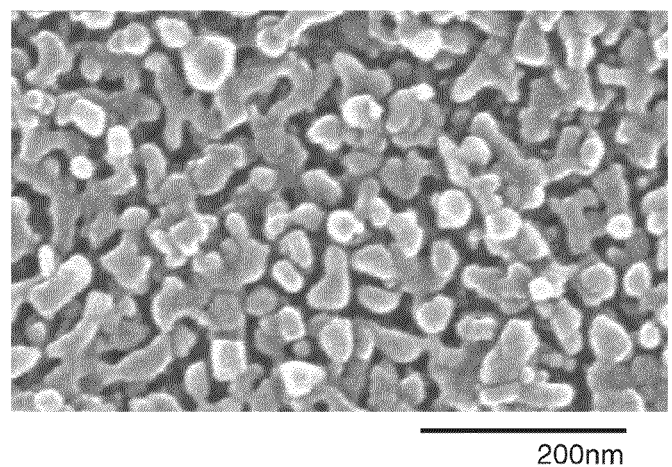
FIG. 5 is an SEM photograph of an island-shaped film according to Example 3.

Subsequently, in the same manner as in Example 2, the Al film was subjected to a plasma treatment using an ICP dry etcher. By the plasma treatment, an island-shaped film could be formed on the glass substrate. FIG. 5 shows an SEM photograph of the island-shaped film. The island-shaped film shown in FIG. 5 had island-shaped particles which are composed of AlF, have a particle diameter of about 10 to 50 nm, and are arranged in a plane and also had a region in which the surface of the substrate is exposed among the island-shaped particles.

Subsequently, by stretching the glass substrate, the island-shaped film composed of AlF was stretched along with the glass substrate, whereby needle-shaped particles 12b composed of AlF and having a shape as shown in FIG. 2B could be obtained. Further, by reducing the metal halide constituting the needle-shaped particles 12b, needle-shaped metal particles 12c composed of Al were formed.

Example 4

In the above-described Examples 1 to 3, the halogenation of the metal constituting the coating film 11 and the formation of the island-shaped particles 12a were performed simultaneously, however, in Example 4, these processes were performed in separate steps. Specifically, the island-shaped film forming step in which an island-shaped film is formed by partially removing a coating film and the halogenating step in which the formed island-shaped film is halogenated were performed in this order.

In the island-shaped film forming step, it is preferred to use a dry etching process, and a sputter etching process using an inert gas (such as Ar) is simple and preferred. In the island-shaped film forming step in this Example, it is not necessary to halogenate the metal constituting the coating film, and therefore, processing can be performed under a condition in which all of the island-shaped particles are not halogenated, or the type of the reactive gas can be selected by giving priority to the processing properties.

Specifically, a glass substrate having an Ag thin film formed thereon was placed in a vacuum vessel of an ICP dry etcher. Then, Ar plasma was generated by applying an AC power (oscillation frequency: 13.56 MHz) to an ICP antenna at 300 W while introducing Ar gas (flow rate: 50 sccm) into the vacuum vessel to give a pressure of 5.0 Pa, and the Ag film was subjected to a plasma treatment under a condition that a substrate bias was 60 W. By the above plasma treatment, an island-shaped film (an island-shaped Ag film) could be formed on the glass substrate. This island-shaped film had island-shaped particles which are composed of Ag, have a particle diameter of about 50 to 200 nm, and are arranged in a plane and also had a region in which the surface of the substrate is exposed among the island-shaped particles.

It is not necessary to consider the processability of the coating film in the halogenating step, and therefore, the process gas can be selected by giving priority to the physical properties of the metal halide to be produced or the halogenation efficiency.

Specifically, the glass substrate having the island-shaped Ag film formed thereon was placed in a vacuum vessel of an ICP dry etcher. Then, $Cl_2$ plasma was generated by applying an AC power (oscillation frequency: 13.56 MHz) to an ICP antenna at 300 W while introducing a mixed gas containing $Cl_2$ gas (flow rate: 20 sccm) and $BCl_3$ gas (flow rate: 40 sccm) into the vacuum vessel to give a pressure of 0.70 Pa, and the Ag film was subjected to a plasma treatment under a condition that a substrate bias was 0 W. By the above plasma treatment, a halogenated island-shaped AgClx film could be formed on the glass substrate. This island-shaped film had island-shaped particles which are composed of AgClx, have a particle diameter of about 30 to 150 nm, and are arranged in a plane and also had a region in which the surface of the substrate is exposed among the island-shaped particles.

Subsequently, by stretching the glass substrate, the island-shaped film composed of AgClx was stretched along with the glass substrate, whereby needle-shaped particles 12b composed of AgClx and having a shape as shown in FIG. 2B could be obtained. Further, by reducing the metal halide constituting the needle-shaped particles 12b, needle-shaped metal particles 12c composed of Ag were formed.

In Examples 1 to 4, an island-shaped monolayer film composed of a metal halide was formed on a glass substrate, and the glass substrate was stretched. However, if the performance as a polarizing element is not sufficient by forming only a monolayer as the island-shaped film composed of a metal halide, after a plurality of island-shaped films composed of a metal halide are laminated on a glass substrate, the resulting glass substrate may be stretched.

In this case, a transparent insulating film is formed on an island-shaped film composed of a metal halide as a first layer, and then, an island-shaped film composed of a metal halide as a second layer is formed on the insulating film. By providing the insulating film between the island-shaped film composed of a metal halide as the first layer and the island-shaped film composed of a metal halide as the second layer, the laminated two island-shaped films are prevented from fusing with each other. If there is a need for an island-shaped film composed of a metal halide as a third layer, another transparent insulating film is further formed on the island-shaped film composed of a metal halide as the second layer, and then, an island-shaped film composed of a metal halide as a third layer may be formed on the second layer through the insulating film. As a material for the insulating film, a transparent material such as silicon oxide, silicon nitride, titanium oxide, or zirconium oxide can be used. The thickness of the insulating film is not particularly limited, however, it can be set to, for example, 100 nm.

After a plurality of the island-shaped films composed of a metal halide are laminated as described above, the glass substrate is stretched so as to stretch the plurality of the island-shaped films composed of a metal halide along with the glass substrate, whereby needle-shaped particles 12b composed of a metal halide and having a shape as shown in FIG. 2B in plan view can be obtained. Further, by reducing the metal halide constituting the needle-shaped particles 12b, needle-shaped metal particles 12c can be formed.

As described above, it was confirmed by using various materials that, an island-shaped film having a shape similar to that of the island-shaped film 12 shown in FIG. 2A can be formed. Such an island-shaped film is an assembly of island-shaped particles composed of AgClx, AgF, or AlF, and therefore, by stretching the glass substrate, such an island-shaped film is stretched along with the glass substrate, and needle-shaped particles 12b having a shape shown in FIG. 2B can be obtained. In this manner, according to the invention, a polarizing element having excellent optical properties can be simply produced with an extremely small environmental load as compared with the related art.

The entire disclosure of Japanese Patent Application No. 2011-061051, filed on Mar. 18, 2011 is expressly incorporated by reference herein.

What is claimed is:

1. A method for producing a polarizing element, comprising the steps of:
   forming a coating film of a metal on a glass substrate;
   forming an island-shaped film composed of a metal halide on the glass substrate by partially removing the coating film and also halogenating the metal;
   forming needle-shaped particles of the metal halide by stretching the glass substrate through heating to elongate the island-shaped film; and
   forming needle-shaped metal particles composed of the metal by reducing the metal halide of the needle-shaped particles.

2. The method for producing a polarizing element according to claim 1, wherein the step of forming the island-shaped film composed of the metal halide includes the steps of:
   forming the island-shaped film by etching the coating film; and
   halogenating the metal by exposing the glass substrate to a gas containing a halogen or a halogen compound.

3. The method for producing a polarizing element according to claim 1, wherein the step of forming the island-shaped film composed of the metal halide is a step of exposing the coating film to plasma of a gas containing a halogen or a halogen compound, thereby halogenating the metal while partially removing the coating film.

4. The method for producing a polarizing element according to claim 1, wherein the metal is one or more metals selected from Au, Ag, Cu, Cd, and Al.

* * * * *